(12) United States Patent
Saito et al.

(10) Patent No.: US 8,459,308 B2
(45) Date of Patent: Jun. 11, 2013

(54) CYLINDRICAL SHAFT, TRANSPORT ROLLER, TRANSPORT UNIT, AND PRINTING APPARATUS

(75) Inventors: Koichi Saito, Matsumoto (JP); Katsunori Ono, Shiojiri (JP); Kenji Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 226 days.

(21) Appl. No.: 12/704,482

(22) Filed: Feb. 11, 2010

(65) Prior Publication Data

US 2010/0206687 A1 Aug. 19, 2010

(30) Foreign Application Priority Data

Feb. 13, 2009 (JP) ................. 2009-031831

(51) Int. Cl.
*F16L 9/00* (2006.01)
(52) U.S. Cl.
USPC .......................................................... 138/166
(58) Field of Classification Search
USPC .................... 193/37; 198/156, 165, 166, 169, 198/170
See application file for complete search history.

(56) References Cited

U.S. PATENT DOCUMENTS

| | | | | |
|---|---|---|---|---|
| 3,916,086 A | * | 10/1975 | Gillemot et al. | 174/93 |
| 4,490,422 A | * | 12/1984 | Pascher | 428/35.1 |
| 5,117,970 A | * | 6/1992 | Gibbs | 198/842 |
| 6,540,218 B2 | | 4/2003 | Tsukada et al. | |
| 6,712,755 B2 | * | 3/2004 | Chang | 600/114 |
| 6,782,598 B2 | * | 8/2004 | Tsubouchi et al. | 29/469.5 |
| 6,893,720 B1 | * | 5/2005 | Nakahigashi et al. | 428/408 |
| 6,904,941 B2 | * | 6/2005 | Howard | 138/167 |
| 7,067,027 B2 | * | 6/2006 | Swift | 156/153 |
| 7,458,726 B2 | * | 12/2008 | Seilheimer | 384/276 |
| 7,610,938 B2 | | 11/2009 | Yanokura et al. | |

FOREIGN PATENT DOCUMENTS

| | | |
|---|---|---|
| JP | 60-046831 A | 3/1985 |
| JP | 3271048 B2 | 4/2002 |
| JP | 2006-289496 A | 10/2006 |
| JP | 2007-025196 A | 2/2007 |
| JP | 2007-203342 A | 8/2007 |
| JP | 2008-068977 A | 3/2008 |

* cited by examiner

*Primary Examiner* — Douglas Hess
(74) *Attorney, Agent, or Firm* — Kilpatrick Townsend & Stockton LLP

(57) ABSTRACT

A cylindrical shaft is provided of which a pair of ends are formed in a cylindrical shape by a press work so as to form a joining portion therebetween. Here, the joining portion includes: a central linear section which is provided on a center portion in an axis direction of the cylindrical shaft and is formed in a linear shape to be parallel to the axis direction of the cylindrical shaft; and a folded section which includes a plurality of intersections which are provided on both ends of the center portion and are disposed so as to be extended in a direction perpendicular to the axis direction of the cylindrical shaft, and a connection linear section which connects ends of a pair of the adjacent intersections.

20 Claims, 13 Drawing Sheets

CYLINDRICAL SHAFT, TRANSPORT ROLLER, TRANSPORT UNIT, AND PRINTING APPARATUS

CROSS-REFERENCE TO RELATED APPLICATIONS

This application claims the benefit of priority to Japanese Patent Application No. 2009-031831 filed Feb. 13, 2009, the contents of which are hereby incorporated by reference in their entirety.

BACKGROUND

1. Technical Field

The present invention relates to a cylindrical shaft, a transport roller, a transport unit, and a printing apparatus.

2. Related Art

In the past, various printers have been provided as printing apparatuses. These printers are configured such that recording media such as paper are transported to a printing unit by a transport roller (paper feeding roller) and a driven roller, and after printing is performed, the media are discharged by the discharge roller (driving roller) and the driven roller (GIZA roller).

In such a printer, the transport roller rotates in a state where the paper is interposed between the transport roller and the driven roller, so that the paper is moved in a sub scanning direction perpendicular to a moving direction of a carriage. Since the paper must be transported to the recording position with high accuracy and be sequentially fed in synchronization with the printing speed, a high transportation force is required.

In order that the transport roller has a high frictional force, Japanese Patent No. 3271048 discloses a technique in that a large number of protrusions are formed on a circumferential surface of a metallic round bar by an embossing work.

In the technique, there is a problem that workability is very poor at forming the protrusions on the shaft-like (cylindrical) surface along the circumferential direction. In addition, since a solid material is used, the cost is also increased.

In view of the above situation, JP-A-2006-289496 discloses with the aim of cost reduction, in that a metal plate is subjected to a bending work to form a shaft (cylindrical shaft) in a cylindrical shape (hollow shape) and the cylindrical shaft is used instead of the solid metallic round bar member. That is, in JP-A-2006-289496, there is proposed a cylindrical shaft which is formed of a metal plate by bonding a pair of ends facing each other, and each of the ends is provided with a convex portion which protrudes from the end and has a width becoming wider as a position moves away from the end, and a concave portion which is dented from the end and has a width becoming wider as a position moves away from the end. In addition, the convex portion and the concave portion of one end are fitted to the concave portion and the convex portion of the other end.

However, when the cylindrical shaft as disclosed in JP-A-2006-289496 is used as the transport roller in order to achieve cost reduction and weight reduction, it is difficult to make the cylindrical shaft have a high frictional force.

For example, it may be considered that the surface is beaten by a pressing work to form protrusions as in the case disclosed in Japanese Patent No. 3271048. However, in this case, since the shaft is hollow, it is easily deformed.

In addition, in the cylindrical shaft disclosed in JP-A-2006-289496, the convex portions and the concave portions are formed on a pair of the ends facing each other over the entire region (entire length) in the length direction, and the convex portions and the concave portions of the pair of the ends are fitted to each other. That is, in the joining portion between the pair of the ends, fitting sections between the convex portions and the concave portions are continuously formed over the entire region (entire length) in the length direction.

When the fitting sections between the convex and concave portions are formed over the entire length of the joining portion as described above, it is difficult to fit the convex and concave portions in the fitting sections as it was designed, and to fit the convex and concave portions to each other. As a result, deformation or distortion easily occurs on the entire of the cylindrical shaft. In addition, roundness or deflection with a set value or more is hardly obtained, so that it is difficult to obtain the shape and the dimension with good accuracy.

Therefore, when the cylindrical shaft which is insufficient in the accuracy of the shaft and the dimension is applied to the transport roller as described above, it may act as one factor causing uneven transportation. In addition, a so-called ink jet printer, which forms images by ejecting fine droplets, necessitates very high accuracy in feeding paper. Therefore, in particular, the occurrence of uneven transportation caused by the groove becomes problematic.

SUMMARY

An advantage of some aspects of the invention is to provide a cylindrical shaft with a good accuracy of the shape or the dimension, a transport roller which can be reduced in the cost and the weight and in which uneven transportation is also prevented, a transport unit and a printing apparatus which use the transport roller.

According to an aspect of the invention, there is provided a cylindrical shaft of which a pair of ends are formed in a cylindrical shape by a press work so as to form a joining portion therebetween. Here, the joining portion includes: a central linear section which is provided on a center portion in an axis direction of the cylindrical shaft and is formed in a linear shape to be parallel to the axis direction of the cylindrical shaft; and a folded section which includes a plurality of intersections which are provided on both ends of the center portion and are disposed so as to be extended in a direction perpendicular to the axis direction of the cylindrical shaft, and a connection linear section which connects ends of a pair of the adjacent intersections.

According to the cylindrical shaft, the joining portion formed between the pair of the ends is formed in a linear shape to be substantially parallel to the center axis of the cylindrical shaft in the center portion of the cylindrical shaft in the width direction, and the folded section is formed only on both sides of the central linear section which is formed in the linear shape. Therefore, there is no fitting between the concave and convex portions in the central linear section of the joining portion. For this reason, deformation or distortion hardly occurs on the cylindrical shaft compared with the case where the fitting sections between the concave and convex portions are formed over the entire length of the joining portion. In addition, the accuracy of the shaft or the dimension such as the roundness or the deflection is easily obtained.

In the above-mentioned cylindrical shaft, a distance between the pair of the ends of the central linear section may be longer than a distance between the pair of the ends of the intersections.

According to such a configuration, the distance between the pair of the ends facing each other is relatively shortened in the intersection. Therefore, the gap formed between the ends is significantly narrowed, or the gap is removed. In particular, the deviation between one end and the other end in the longitudinal direction (axial direction) is regulated by a pair of the ends of the intersection. Therefore, deformation or distortion is unlikely to occur on the cylindrical shaft.

In the above-mentioned cylindrical shaft, the pair of the ends facing each other in the intersection may be formed such that end surfaces thereof come into contact with each other.

According to such a configuration, since the gap formed between the pair of the ends is removed, deformation or distortion is less likely to occur on the cylindrical shaft.

In the above-mentioned cylindrical shaft, the connection linear section may be formed to be parallel to a center axis of the cylindrical shaft.

According to such a configuration, the connection linear section in the folded section is formed in substantial parallel to the central linear section. Therefore, when the metal plate is subjected to the press work, the pair of the ends facing to each other over the entire length of the joining portion can be formed close to each other with relatively high accuracy or come into contact with each other.

In the above-mentioned cylindrical shaft, the intersection may be formed so as to be extended in a direction substantially perpendicular to a center axis of the cylindrical shaft.

According to such a configuration, when the metal plate is subjected to the press work, the ends facing each other in the interjection can be formed close to each other with relatively high accuracy or come into contact with each other.

In the above-mentioned cylindrical shaft, the connection linear section may be constituted by a first linear section which connects ends on one side of the pair of the intersections and a second linear section which connects ends on the other side of the pair of the intersections. In addition, the first linear section and the central linear section may be formed on the same straight line.

According to such a configuration, when the metal plate is subjected to the press work, the pair of the ends facing each other over the entire length of the joining portion can be formed close to each other with relatively high accuracy or come into contact with each other.

In the above-mentioned cylindrical shaft, the first linear section may be formed longer than the second linear section.

According to such a configuration, when the metal plate is subjected to the press work, the pair of the ends facing to each other over the entire length of the joining portion can be formed close to each other with relatively high accuracy or come into contact with each other.

According to another aspect of the invention, there is provided a transport roller which includes: the cylindrical shaft according to claim 1, and a high friction layer which is provided on a surface of the cylindrical shaft and contains inorganic particles.

According to the transport roller, the cylindrical shaft is used which is obtained such that the metal plate is subjected to the press work to be formed in a cylindrical shape. Therefore, the cost reduction and the weight reduction can be achieved compared with the case where a round bar made of a solid material is used. In addition, since the high friction layer containing the inorganic particles is provided on the surface of the cylindrical shaft, a good transportation force can be exhibited by the high friction layer.

In addition, since the cylindrical shaft is easily formed to obtain a good accuracy of the shape or the dimension as described above, uneven transportation caused by the insufficient accuracy is suppressed.

In the above-mentioned transport roller, the high friction layer may be provided on at least a region with which a medium transported by the transport roller comes into contact.

According to such a configuration, by providing the high friction layer on the region coming into contact with the medium, the cost of the material for the high friction layer is reduced to a minimum.

In the transport roller, the high friction layer may be provided on at least a region corresponding to the central linear section.

In general, both ends of the cylindrical shaft constituting the transport roller are a part for attaching a connection element of the driving system such as a toothed wheel. The center portion of the cylindrical shaft comes into direct contact with a recording medium such as paper. Therefore, by providing the high friction layer on the region corresponding to the above-mentioned central linear section, the cost of the material for the high friction layer is reduced to a minimum.

According to another aspect of the invention, there is provided a transport unit which includes the transport roller according to the invention, a driven roller which is driven as the transport roller is rotated, and a driving device which rotatably drives the transport roller.

According to the transport unit, as described above, there is provided the transport roller in which the cost reduction and furthermore the weight reduction can be achieved and uneven transportation is suppressed. Therefore, the transport unit can be reduced in cost and weight, and furthermore the transportability of the recording medium by the transport roller is also excellent.

In the transport unit, a surface of the driven roller may be subjected to a low-abrasion treatment.

According to such a configuration, by coming into contact with the transport roller, and particularly to the high friction layer, it is possible to suppress damage on the driven roller.

In the transport unit, the driven roller may be disposed in a position coming into contact with the high friction layer of the transport roller.

According to such a configuration, a force for interposing the recording medium such as paper is increased between the transport roller and the driven roller, and transportation performance of the recording medium is more favorable.

According to still another aspect of the invention, there is provided a printing apparatus which includes the above-mentioned transport unit, a print unit which carries out a printing process on a transported recording medium, and a control unit which controls the printing process of the print unit.

According to such a configuration, since the transport unit is provided, the cost and the weight can be reduced, and furthermore the printing apparatus is excellent in transporting the recording medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
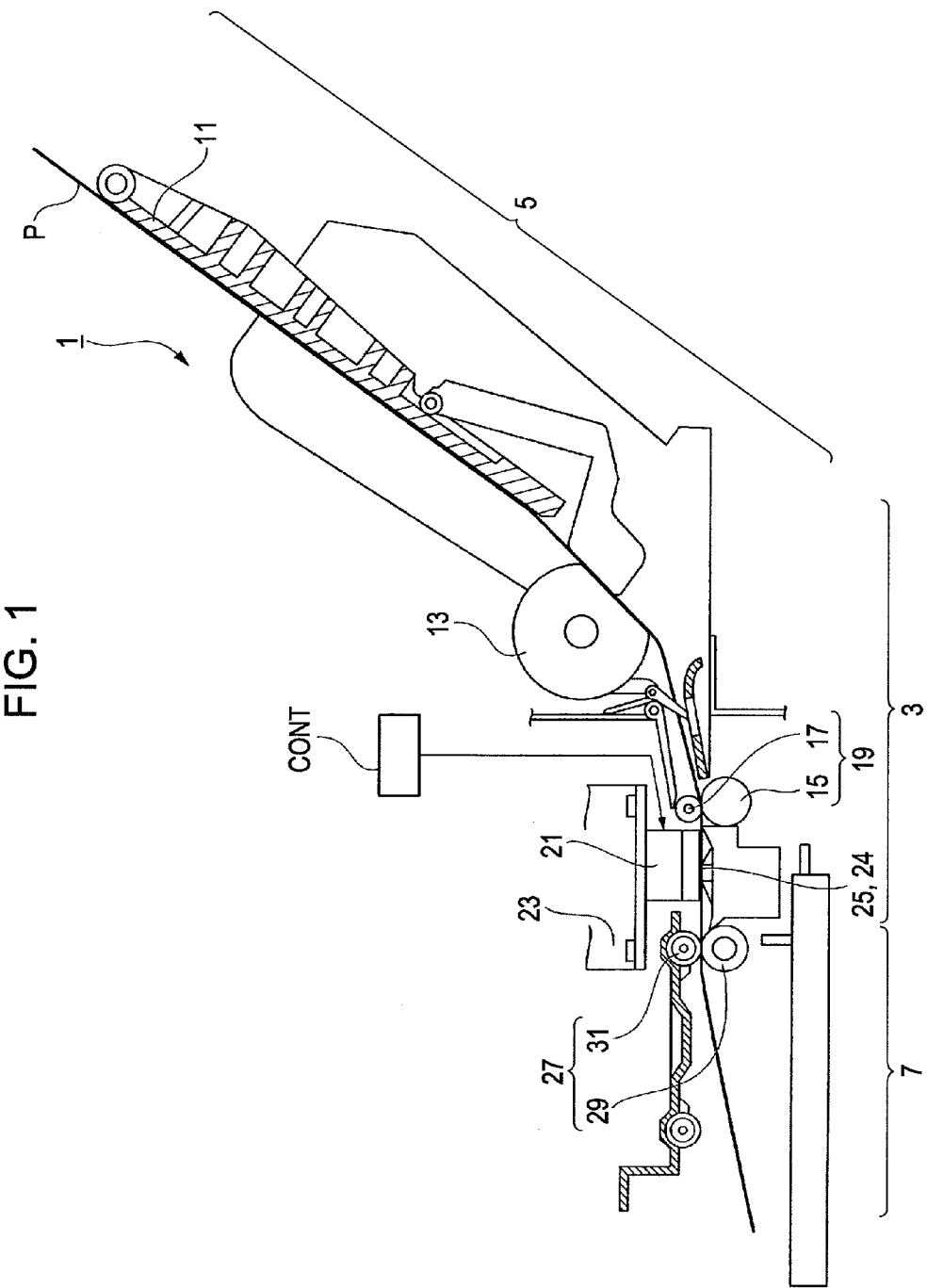
FIG. 1 is a sectional side view illustrating an ink jet printer according to the invention.

In the following, the invention will be described in detail with reference to the drawings. Further, scales of the respective components are appropriately modified from actual so as to recognize the components in the drawings for explanation.

Figure 2B:
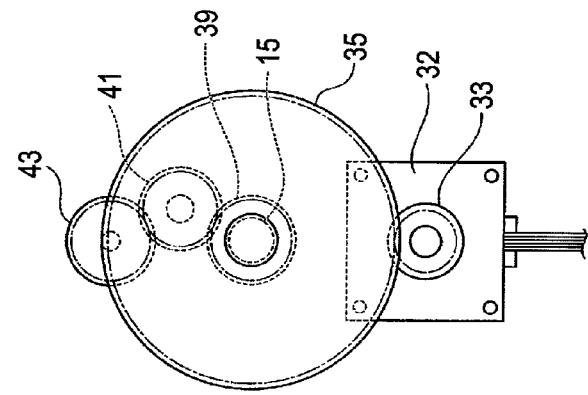
FIG. 2B is a side view illustrating a driving system of a transport unit.
Figure 2A:
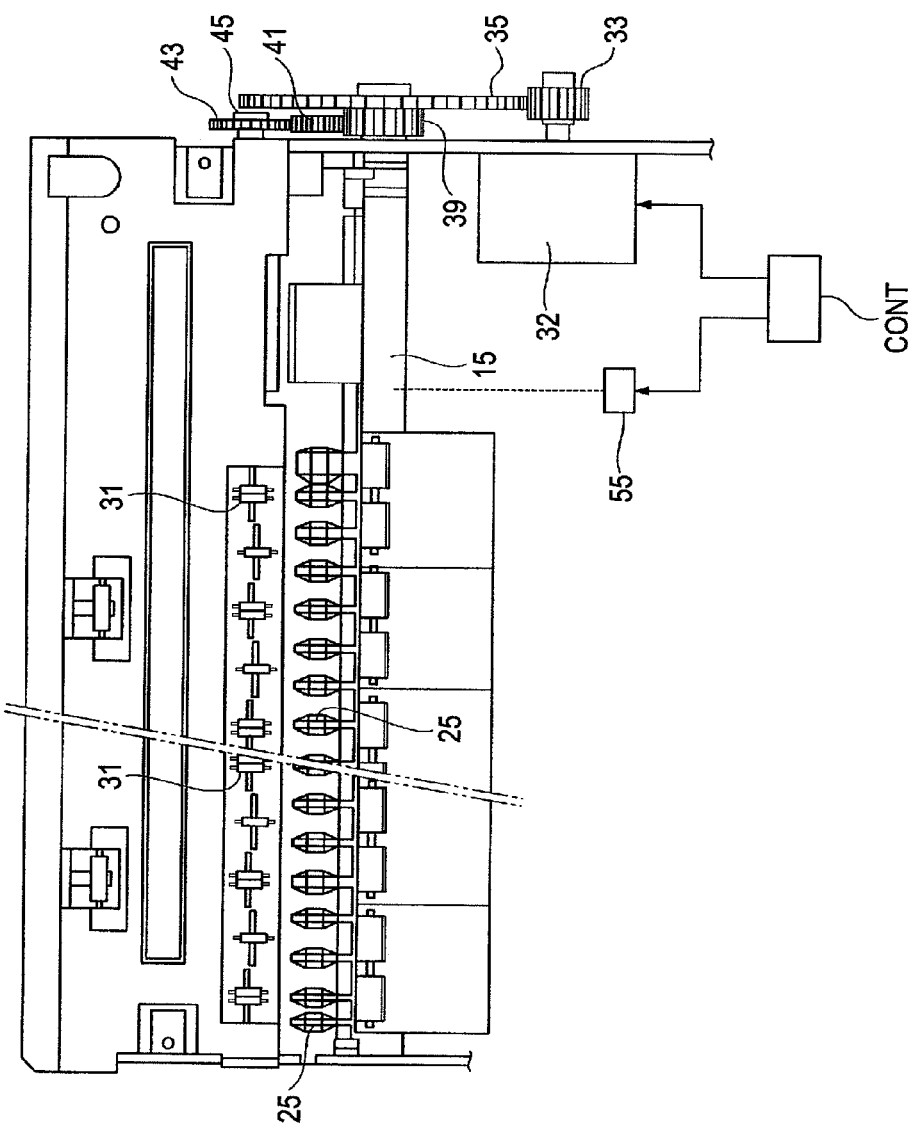
FIG. 2A is a plan view illustrating a transport unit.

First, the printing apparatus provided with the transport roller according to the invention will be described with reference to FIGS. 1 and 2. Further, FIG. 1 is a sectional side view illustrating the printing apparatus (ink jet printer) which is provided with the transport unit according to the invention. FIG. 2A is a plan view illustrating the transport unit of the same printing apparatus. FIG. 2B is a side view illustrating a driving system of the same printing apparatus.

In FIG. 1, the reference numeral 1 denotes the ink jet printer which is the printing apparatus according to an embodiment of the invention. The ink jet printer 1 is configured to include a printer body 3, a paper feeding unit 5 which is provided above the rear side of the printer body 3, and a paper discharge unit 7 which is formed on the front of the printer body 3.

A paper feeding tray 11 is provided on the paper feeding unit 5, and plural pieces of paper (recording media) P are loaded on the paper feeding tray 11. Here, as the paper P, plain paper, coated paper, OHP (over head projector) sheet, glossy paper, glossy films and the like can be used. A paper feeding roller 13 is provided on the downstream side of the paper feeding tray 11. The paper feeding roller 13 pinches the paper P which is positioned on the uppermost portion of the paper feeding tray 11 between separate pads (not shown) facing each other so as to send the paper forward.

The sent paper P reaches a transport roller mechanism 19 which is constituted by a transport roller 15 disposed on the lower side and a driven roller 17 disposed on the upper side. The transport roller 15 corresponds to the transport roller according to the embodiment of the invention as described later. In addition, the transport unit according to the embodiment of the invention is constituted by the transport roller 15, the driven roller 17, and a driving apparatus which drives the transport roller 15.

While being subjected to an accurate and correct transporting (paper feeding) operation by rotational driving of the transport roller 15 in accordance with the print process, the paper P reached to the transport roller mechanism 19 is transported to a print head (print unit) 21 which is positioned on the downstream side of the transport roller mechanism 19.

The print head 21 is held on to a carriage 23. The carriage 23 is configured to reciprocally move in a direction perpendicular to a paper feeding direction (transport direction of the paper P). A platen 24 is disposed on the position facing the print head 21. The platen 24 is constituted by plural diamond ribs 25 which are disposed along a moving direction of the carriage 23 with gaps therebetween. The diamond ribs 25 serve to support the paper P from the lower side when the print head 21 carries out printing on the paper P. Specifically, the top surfaces of the diamond ribs 25 serve as the support surface.

Further, the print process (print job) carried out by the print head 21 is controlled by a control unit CONT.

The distance between the print head 21 and the diamond ribs 25 can be adjusted according to the thickness of the paper P. Therefore, while smoothly passing through the top surfaces of the diamond ribs 25, the paper P is subjected to the printing with the high quality. The paper P printed by the print head 21 is sequentially discharged by a paper discharge roller 27 which is provided on the paper discharge unit 7.

The paper discharge roller mechanism 27 is configured to include a paper discharge roller 29 disposed on the lower side and a paper discharge GIZA roller 31 disposed on the upper side. Therefore, the paper P is withdrawn by the rotational driving of the paper discharge roller 29 so as to be discharged.

Here, in the transport roller mechanism 19 and the paper discharge roller mechanism 27, the transport roller 15, the driving system of the paper discharge roller 29, and the relationship between driving speeds of both the rollers 15 and 29 will be described.

As shown in FIGS. 2A and 2B, a transport motor (driving apparatus) 32 is provided in the printer body 3, which is driven under control of the control unit CONT. A pinion 33 is provided on the driving shaft of the transport motor 32. A transport driving gear 35 is meshed with the pinion 33. The transport roller 15 is inserted into and connected to the transport driving gear 35. With such a configuration as described above, the transport motor 32 becomes the driving apparatus for rotational driving the transport roller 15.

In addition, in the transport roller 15, an inner gear 39 is provided on the same shaft as that of the transport driving gear 35. A medium gear 41 is meshed with the inner gear 39. A paper discharge driving gear 43 is meshed with the medium gear 41. The rotation shaft of the paper discharge driving gear 43 becomes a shaft body 45 of the paper discharge roller 29 as shown in FIG. 2A. With such a configuration, the transport roller 15 of the transport roller mechanism 19 and the paper discharge roller 29 of the paper discharge roller mechanism 27 receive a rotational driving force from the transport motor 32 which is only one driving source so as to be rotated.

Further, the rotation speed of the paper discharge roller 29 is set to be higher than the rotation speed of the transport roller 15 by adjusting gear ratios between the respective gears. Therefore, the paper discharge speed of the paper discharge roller mechanism 27 increases by an acceleration rate s by the transport speed of the transport roller mechanism 19.

In addition, an interposing force (pressing force) of the paper P generated by the transport roller mechanism 19 is set to be higher than the interposing force (pressing force) generated by the paper discharge roller mechanism 27. Therefore, when the paper P is interposed by both the transport roller mechanism 19 and the paper discharge roller mechanism 27 at the same time, the transport speed of the paper has nothing to do with the paper discharge speed of the paper discharge roller mechanism 27, but is defined by the transport speed of the transport roller mechanism 19.

Next, the transport roller mechanism 19 which is provided with the transport roller 15 according to the invention will be described.

Figure 3:
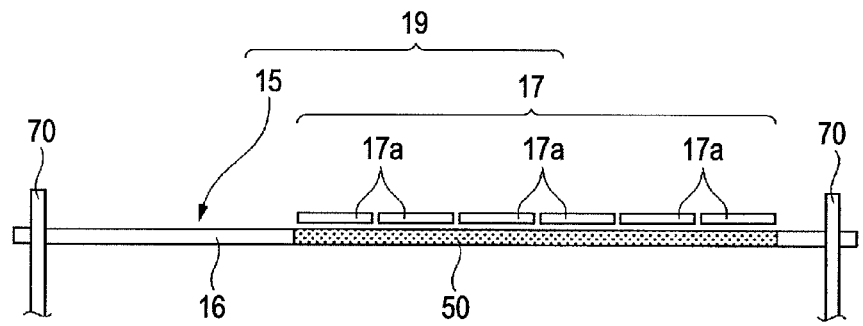
FIG. 3 is a diagram illustrating a configuration of a transport roller.

FIG. 3 shows a schematic configuration of the transport roller mechanism 19 which is constituted by the transport roller 15 and the driven roller 17.

The transport roller 15 is provided with a roller body 16 which is formed such that a metal plate such as a zinc-coated steel plate and a stainless steel plate is subjected to a press work so as to be formed in a cylindrical shape, and a high friction layer 50 which is formed on a surface of the roller body 16. Here, the roller body 16 corresponds to the cylindrical shaft according to the embodiment of the invention.

In addition, the transport roller 15 is configured such that both ends thereof are held on to a bearing 70. In particular, in the end to which the inner gear 39 or the transport driving gear 35 is connected, an engaging section (not shown) is formed so as to be rotatably connected to the inner gear 39 or the transport driving gear 35. Further, on the transport roller 15, various kinds of engaging sections can be formed as described later so as to be connected to various connection elements. In addition, the high friction layer 50 is selectively formed on the center portion excepting both ends of the roller body 16 in this example.

Since being configured such that plural (for example, 6 pieces) rollers 17a are arranged on the same shaft, the driven roller 17 is disposed in a position which faces the high friction layer 50 of the transport roller 15 and comes into contact with the high friction layer 50. A biasing spring (not shown) is mounted on the driven roller 17 which is constituted by the rollers 17a, and the biasing spring urges the driven roller 17 to the transport roller 15. Therefore, the driven roller 17 comes into contact with the high friction layer 50 of the transport roller 15 by a predetermined pressing force (the interposing force with respect to the paper P). Therefore, the driven roller 17 is rotatably driven as the rotational operation of the transport roller 15. In addition, the force to interpose the paper P between the transport roller 15 and the driven roller 17 becomes larger, so that transportability of the paper P is favorable. Further, the surfaces of the respective roller 17a of the driven roller 17 is subjected to a low-abrasion treatment, for example, fluororesin coating, in order to alleviate damage caused by slidable contact with the high friction layer 50.

In addition, the roller body (cylindrical shaft) 16 is formed such that a metal plate is subjected to a press work so as to close a pair of ends (end surfaces) facing each other or to come into contact with each other, and thus the roller body 16 is formed in a cylindrical shape. Therefore, in the roller body 16, the joining portion is formed between the pair of the ends. In the joining portion, a gap is formed such that the pair of the ends (end surfaces) are slightly separated from each other in general.

Here, as the detailed description of the transport roller 15, the manufacturing method thereof will be described.

Figure 4A:
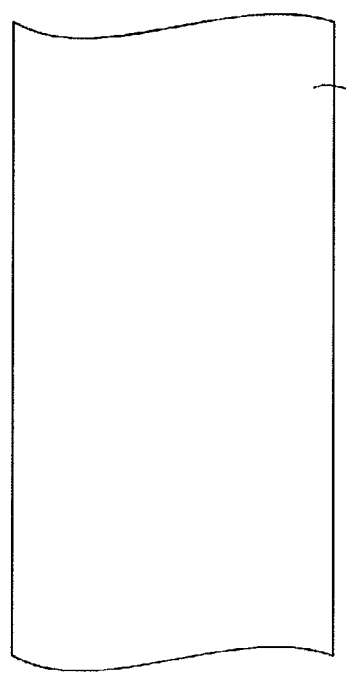
FIG. 4A is a plan view illustrating a metal plate as a base material of a roller body.
Figure 4B:
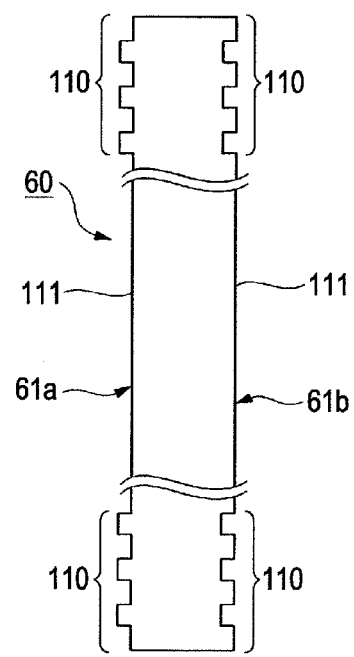
FIG. 4B is a plan view illustrating a metal plate as a base material of a roller body.

In order to manufacture the transport roller 15, first, a large-scale metal plate (first metal plate) 65 in a rectangular plate shape or a stripe shape as shown in FIG. 4A is prepared. As the large-scale metal plate 65, a zinc-coated steel plate with a thickness of about 1 mm is prepared, for example. Then, as shown in FIG. 4B, the large-scale metal plate 65 is subjected to a press work so as to be cut, so that a metal plate (second metal plate) 60 in a thin and long substantially-rectangular plate shape with a size corresponding to the roller body 16, that is, the metal plate 60 is formed as a base material of the roller body 16.

In this case, when the large-scale metal plate 65 is subjected to the press work, at the same time of the above-mentioned cutting process, rectangular concave-convex sections 110 are formed on both ends in the length direction of the ends 61a and 61b which are long sides facing each other in order to form the folded section in the joining portion which is formed between the pair of the above-mentioned ends. In addition, in each of the long sides (ends), linear sections 111 are formed between the concave-convex sections 110 formed on both ends.

Further, the pair of the long sides (ends 61a and 61b) are formed close to each other by the press work or to come into contact with each other. Therefore, between the places corresponding to (that is, facing) each other, when one long side of the concave-convex section 110 corresponds to a convex portion, the other long side of the concave-convex section 110 corresponds to a concave portion, which is quite natural. On the contrary, when one long side of the concave-convex section 110 corresponds to a concave portion, the other long side of the concave-convex portion 110 corresponds to a convex portion.

In addition, when the metal plate 60 is formed as described above, in a case where a pair of the long sides (ends 61a and 61b) is formed close to each other by the press work, the gap which is formed in the joining portion formed between the pair of the long sides, that is, the dimension of the distance between the ends (end surfaces) facing each other in each part is designated to be in the relationship as describe later, and the press work is carried out on the basis of the relationship.

Next, the metal plate 60 is subjected to the press work to be in a cylindrical shape (pipe shape) as shown in the process view of the press work in FIGS. 5A to 5C and FIGS. 6A to 6C, and then the end surfaces 61a and 61b of both the end sides (long sides) are formed close to each other or to come into contact with each other.

Figure 5A:
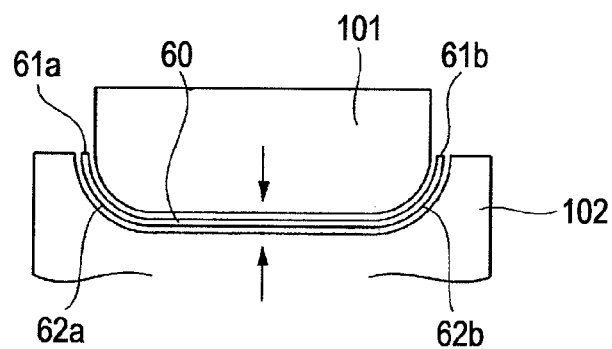
FIG. 5A is a process view illustrating a press work of a metal plate.

That is, first, the metal plate 60 is subjected to the press work by a male die 101 and a female die 102 shown in FIG. 5A, and both the sides 62a and 62b of the metal plate 60 are bent into an arcuate shape (preferably, ¼ arc). Further, in FIG. 5A, in order to easily recognize the respective members, the metal plate 60, the male die 101, and the female die 102 are illustrated with gaps therebetween. In fact, the gaps are not provided, and the metal plate 60 substantially comes into tight contact with the male die 101 and the female die 102. The contact is also the same in FIGS. 5B and 5C and FIGS. 6A to 6C.

Subsequently, the center portion of the metal plate 60 obtained in FIG. 5A in a width direction (bending direction) is subjected to the press work by a male die 103 and a female die 104 shown in FIG. 5B so as to be bent in an arcuate shape (preferably, ¼ arc).

Figure 5B:
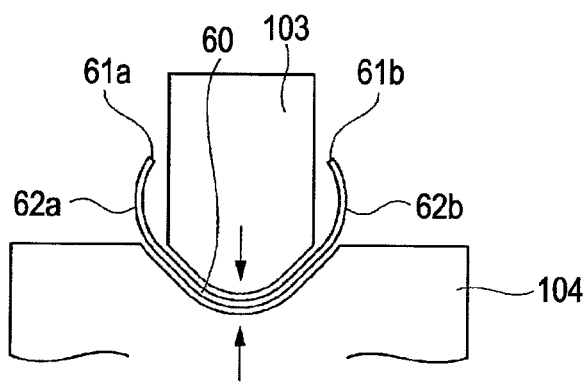
FIG. 5B is a process view illustrating a press work of a metal plate.
Figure 5C:
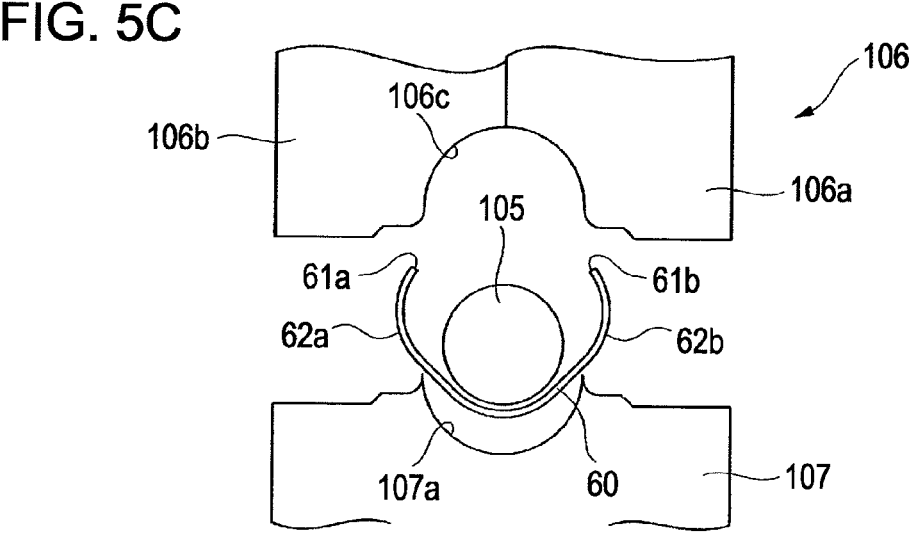
FIG. 5C is a process view illustrating a press work of a metal plate.

Next, as shown in FIG. 5C, a core die 105 is disposed in the metal plate 60 obtained in FIG. 5B. Using an upper die 106 and a lower die 107 shown in FIG. 5C, the respective end surfaces (ends) 61a and 61b of both the sides 62a and 62b of the metal plate 60 are formed close to each other as shown in FIGS. 6A to 6C.

Figure 6A:
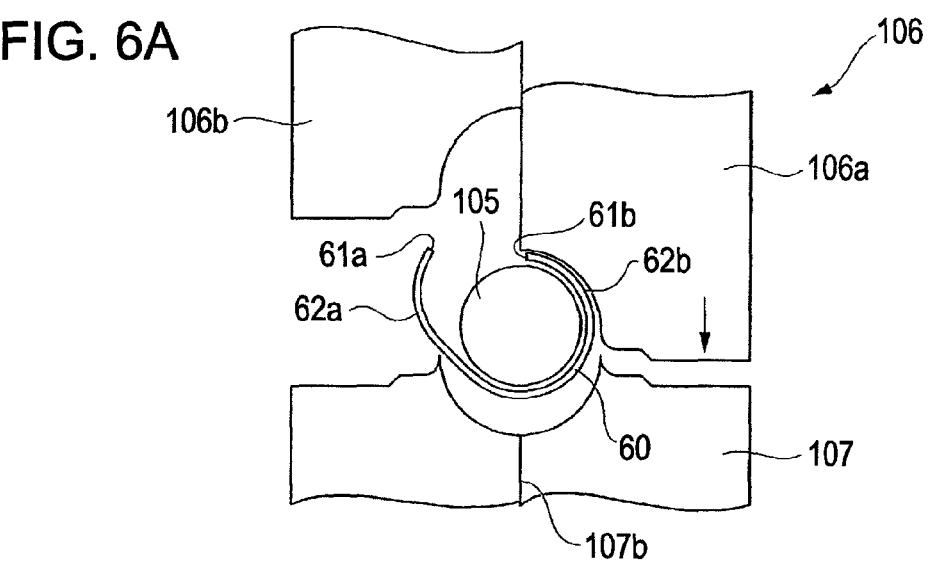
FIG. 6A is a process view illustrating a press work of a metal plate.
Figure 6B:
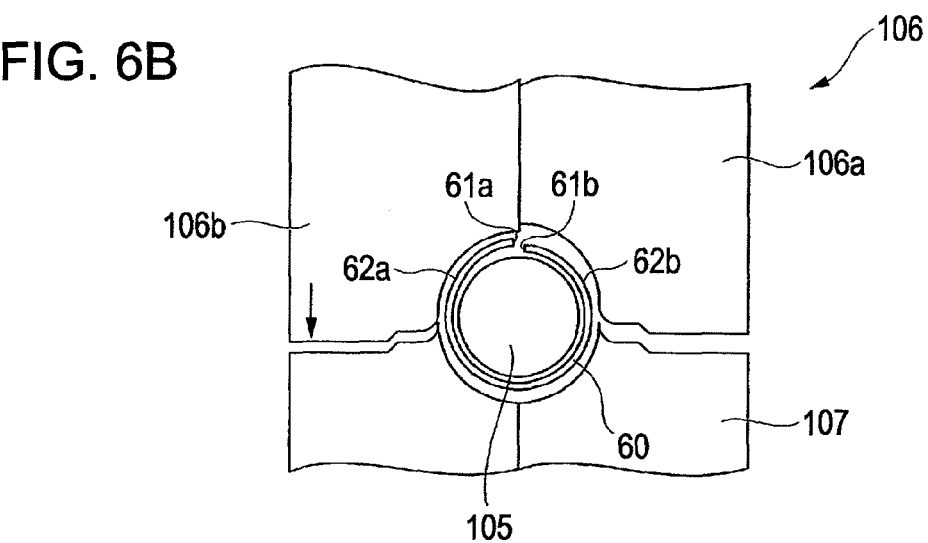
FIG. 6B is a process view illustrating a press work of a metal plate.
Figure 6C:
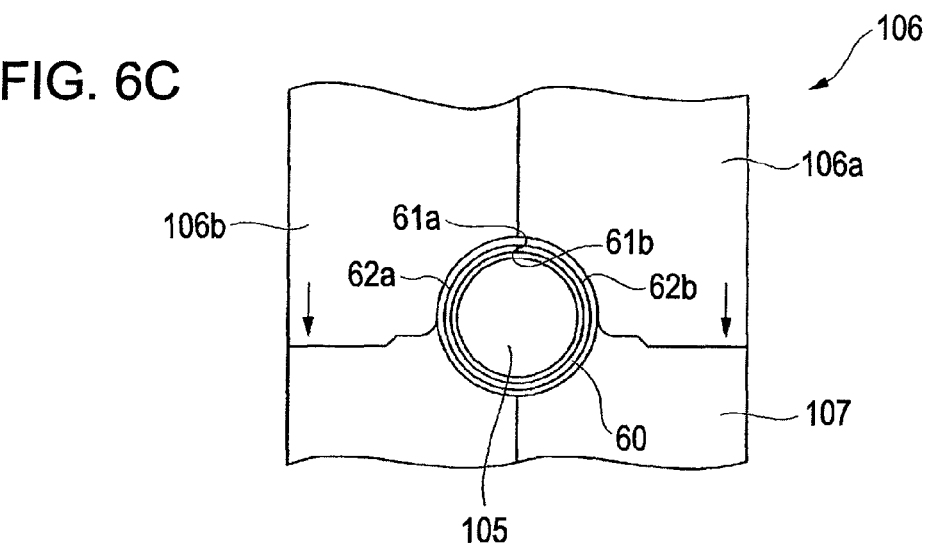
FIG. 6C is a process view illustrating a press work of a metal plate.

Here, the external diameter of the core die 105 shown in FIG. 5C and FIGS. 6A to 6C is equal to the internal diameter of the cylindrical hollow pipe to be formed. In addition, the radius of a press surface 106c of the upper die 106 and the radius of a press surface 107a of the lower die 107 are equal to the radius of the external diameter of the hollow pipe to be formed, respectively. In addition, as shown in FIGS. 6A to 6C, the upper die 106 is configured to include a pair of left and right split dies. The split dies 106a and 106b are configured to separately move in the vertical direction.

That is, from the state shown in FIG. 5C, the right upper die 106a relatively goes down with respect to the lower die 107 (similarly, in the following, the movement of the die means relative movement) as shown in FIG. 6A, one side of the metal plate 60 is subjected to the press work so as to be bent in a substantial semicircular shape. Further, the lower die 107 is also configured to include a pair of left and right split dies similar to the upper die 106 (see the split surface 107b). In the process shown in FIG. 6A, the lower die disposed on the same side may go up.

Next, as shown in FIG. 6B, the core die 106 slightly goes down (to a degree that one end surface 61a and the other end surface 61b can be formed close to each other). In addition, the upper die 106b on the other side goes down, so that the other side of the metal plate 60 is subjected to the press work so as to be bent in a substantially circular shape.

Then, as shown in FIG. 6C, the core die 105 and the pair of the upper dies 106a and 106b go down at the same time so as to form the cylindrical hollow pipe (roller body 16). In this state, both the left and right end surfaces 61a and 61b are in a state of being sufficiently close to each other or coming into partial contact with each other via a slight gap. That is, in the cylindrical hollow pipe, both ends 61a and 61b of the metal plate 60 as the base material are close to each other or come into contact with each other, so that a joining portion is formed between both ends 61a and 61b. Therefore, both the ends 61a and 61b are slightly separated from each other in general, so that the joining portion is formed with a gap.

Next, in this embodiment, in order to increase roundness of the formed hollow pipe (roller body 16) and to decrease deflection, the centerless grinding process known in the related art is carried out, so that the outer peripheral surface of the hollow pipe (roller body 16) is ground.

Figure 7A:
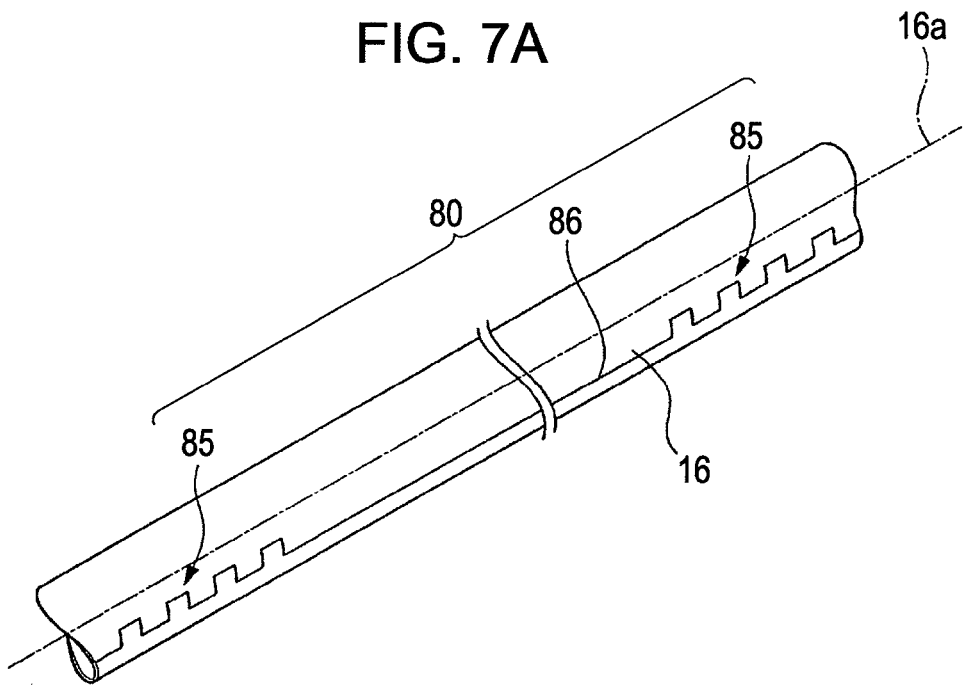
FIG. 7A is a perspective view illustrating a roller body.

Then, the hollow pipe forms the roller body 16, that is, the cylindrical shaft according to the invention, of which the roundness is favorable compared with that before the centerless grinding process is carried out, and the deflection amount is also decreased. In addition, in the roller body (cylindrical shaft) 16, both the ends 61a and 61b is more narrowed, so that the joining portion 80 is formed in which the gap between both the ends 61a and 61b is more narrowed as shown in FIG. 7A.

Further, in the press work or the centerless grinding process, it is preferable that the gap between both the ends 61a and 61b of the metal plate 60 is removed, that is, both the ends 61a and 61b come into contact with each other. However, it is very difficult that while the roundness or the deflection amount of the obtained hollow pipe (roller body 16) is maintained, the gap is removed. Therefore, in this state, a gap is formed to some degree.

In the joining portion 80 formed as described above, as shown in FIG. 7A, the concave-convex portions 110 shown in FIG. 4B are fitted to each other so as to form the folded sections 85 in a rectangular shape on both ends of the roller body 16. In addition, between the folded sections 85, the linear sections 111 shown in FIG. 4B are formed close to each other so as to form a central linear section 86. The central linear section 86 is formed to include the region corresponding to the high friction layer to be described later, that is, the region in which at least the high friction layer is formed.

Figure 7B:
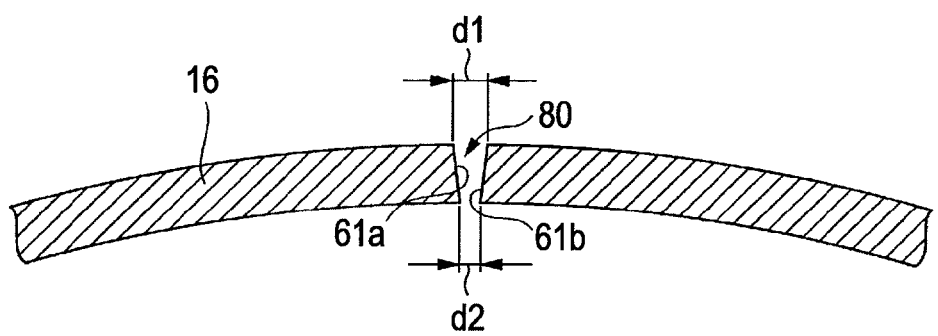
FIG. 7B is a sectional side view illustrating a joining portion.

Further, in the joining portion 80, the outer peripheral surface and the inner peripheral surface of the metal plate 60 are formed with the same dimension (width). Therefore, for example, in the central linear section 86 as shown in FIG. 7B, the distance between the pair of the ends (end surfaces) 61a and 61b is relatively widen on the outer peripheral surface side of the roller body 16, and is relatively narrowed on the inner peripheral surface side thereof. That is, between the pair of the ends 61a and 61b, the distance d1 on the outer peripheral surface side of the roller body 16 is large compared with the distance d2 on the inner peripheral surface side thereof. Specifically, in this embodiment, the distance d1 on the outer peripheral surface side becomes 30 µm, and the distance d2 on the inner surface side becomes 10 µm.

Figure 8:
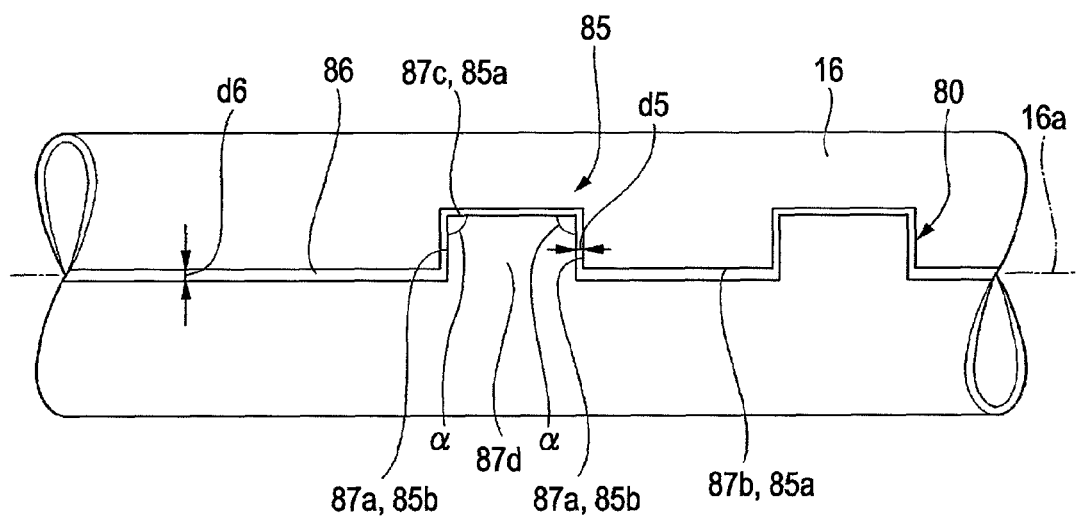
FIG. 8 is a diagram illustrating a shape of a joining portion.

In addition, as shown in FIG. 8, the above-mentioned folded section 85 is constituted by a linear section (connection linear section) 85a which is substantially parallel to the center axis 16a of the roller body 16, and a linear section (intersection) 85b which is perpendicular to the linear section 85a so as to be substantially perpendicular to the center axis 16a. That is, both ends forming the folded section 85 in the joining portion 80 is formed to include plural intersections 87a constituted by the linear sections 85b, a first linear section (connection linear section 85a) 87b connecting one ends of the intersections 87a, and a second linear section (connection linear section 85a) 87c connecting the other ends. Here, the first linear section 87b and the central linear section 86 are formed on the same straight line. In addition, the first linear section 87b is formed longer than the second linear section 87c.

In this embodiment, the distance d5 between the pair of the ends facing each other in the intersection 87a (linear section 85b) of the folded section 85 is formed shorter than the distance d6 between the pair of the ends facing each other in the central linear section 86. Further, both the distances d5 and d6 described here is assumed as distances between ends of the gap which is formed on the outer peripheral surface of the roller body 16.

That is, in this embodiment, the distance d6 in the central linear section 86 is 30 µm as described above, and the distance d5 in the intersection 87a is less than 30 µm. For example, the distance d5 is zero, and thus the pair of the ends facing each other in the intersection 87a (linear section 85b) may come into contact with each other. Furthermore, the concave-convex section 110 may be formed such that the pair of the end surfaces are overlapped with each other as it was designed, and then the end surfaces are fitted to each other by the press work so as to come into contact with each other.

According to such a configuration, the distance d5 is relatively shortened, so that the gap between the ends of the intersection 87a is significantly narrowed (or removed). Therefore, when the metal plate 60 as the base material for forming the roller body 16 is subjected to the press work, the deviation between one end and the other end in the longitudinal direction (axial direction) is regulated by a pair of the ends facing each other which constitutes the intersection 87a. Therefore, deformation or distortion hardly occurs on the roller body 16 (transport roller 15) to be obtained. In addition, uneven transportation caused by deformation or distortion is prevented, which will be described later.

After the roller body 16 is formed which becomes the cylindrical shaft according to the invention as described above, the high friction layer 50 is formed on the surface of the roller body 16 as shown in FIG. 3.

As a method of forming the high friction layer 50, a dry method and a wet method (or a method using the two methods jointly) can be employed. In this embodiment, the dry method is suitably employed.

Specifically, first, as materials for forming the high friction layer 50, resin particles and inorganic particles are prepared. As the resin particles, fine particles which are composed of epoxy adhesive, polyester resin or the like with a diameter of about 10 μm are suitably used.

In addition, as the inorganic particles, ceramics particles are suitably used such as aluminum oxide (alumina; $Al_2O_3$), silicon chloride (SiO), silicon dioxide ($SiO_2$) or the like. Among these, alumina is most suitable as it has relatively high hardness, exhibits the favorable function of increasing frictional resistance, and is relatively low in cost so not to hinder cost reduction. Therefore, in this embodiment, the alumina particles are used as the inorganic particles. The alumina particles are adjusted to be a predetermined particle diameter distribution by a polishing treatment. By manufacturing by the polishing treatment, the ends of the alumina particles are formed to be relatively sharp and pointed, and by the sharply-pointed ends, a high coefficient of friction can be exhibited.

In this embodiment, the alumina particles have a particle diameter ranging from 15 μm to 90 μm and adjusted to have a weighted-average particle diameter (average particle diameter) which is a central diameter of 45 μm. That is, in the invention, the average particle diameter (central diameter) of the alumina particle (inorganic particle) is larger than the distance d1 (30 μm) on the outer peripheral surface side of the joining portion 80. In particular, regarding the particle diameter distribution (particle size range), it is preferable that particles are included which are of a size smaller than the distance d1 on the outer peripheral surface side of the joining portion 80 and larger than the distance d2 (10 μm) on the inner peripheral surface side. In addition, the particle diameter distribution may be preferably used of which a minimum particle diameter is larger than the shortest distance between the pair of the ends 61a and 61b of the joining portion 80, that is, the distance d2 on the inner peripheral surface side thereof.

After the resin particles and the inorganic particles are prepared, first, the resin particles are coated on the roller body 16. That is, the roller body 16 is placed in a paint booth (not shown), and the roller body 16 is charged with, for example, a negative potential in a state where the roller body 16 is a single body.

Then, the resin particles are sprayed (ejected) toward and coat the roller body 16 using a tribo-charging gun of electrostatic equipment (not shown). In addition, the sprayed particles (resin particles) are charged with a high positive potential. Then, the charged resin particles are adsorbed on the outer peripheral surface of the roller body 16 so as to form a resin film.

Figure 9A:
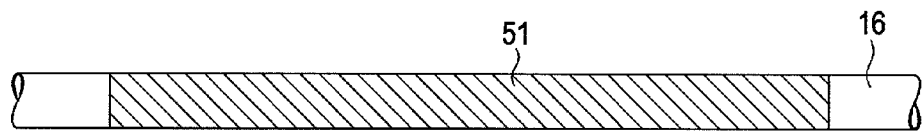
FIG. 9A is a diagram illustrating a formation process of a high friction layer on a roller body.

Here, the resin film formed by coating the resin particles is associated to a formed region of the high friction layer 50 shown in FIG. 3, and not to be formed over the entire length of the roller body 16. For example, both ends of the roller body 16 are masked by a tape or the like. Then, as shown in FIG. 9A, the resin particles are coated only on the center portion excepting both ends thereof. That is, the resin film 51 is selectively formed only on the region corresponding to the center portion, with which at least the paper (medium) P to be transported comes into contact, of the transport roller 15 constituted by the roller body 16, that is, the region corresponding to the central linear section 86. Further, in FIG. 9A and FIGS. 9B and 9C to be described later, the joining portion 80 is omitted.

Weak static electricity of about +0.5 KV remains on the resin film 51 after the spray-coating. Further, when the spray-coating is carried out, the roller body 16 is rotated around the shaft so as to form the resin film 51 with a uniform thickness over the entire peripheral surface thereof. The thickness of the resin film 51 is formed to be about, for example, 10 μm to 30 μm in consideration of the particle diameter of the above-mentioned alumina particles. The film thickness can be properly adjusted by the ejected amount and ejected time period of the resin particles.

Figure 10:
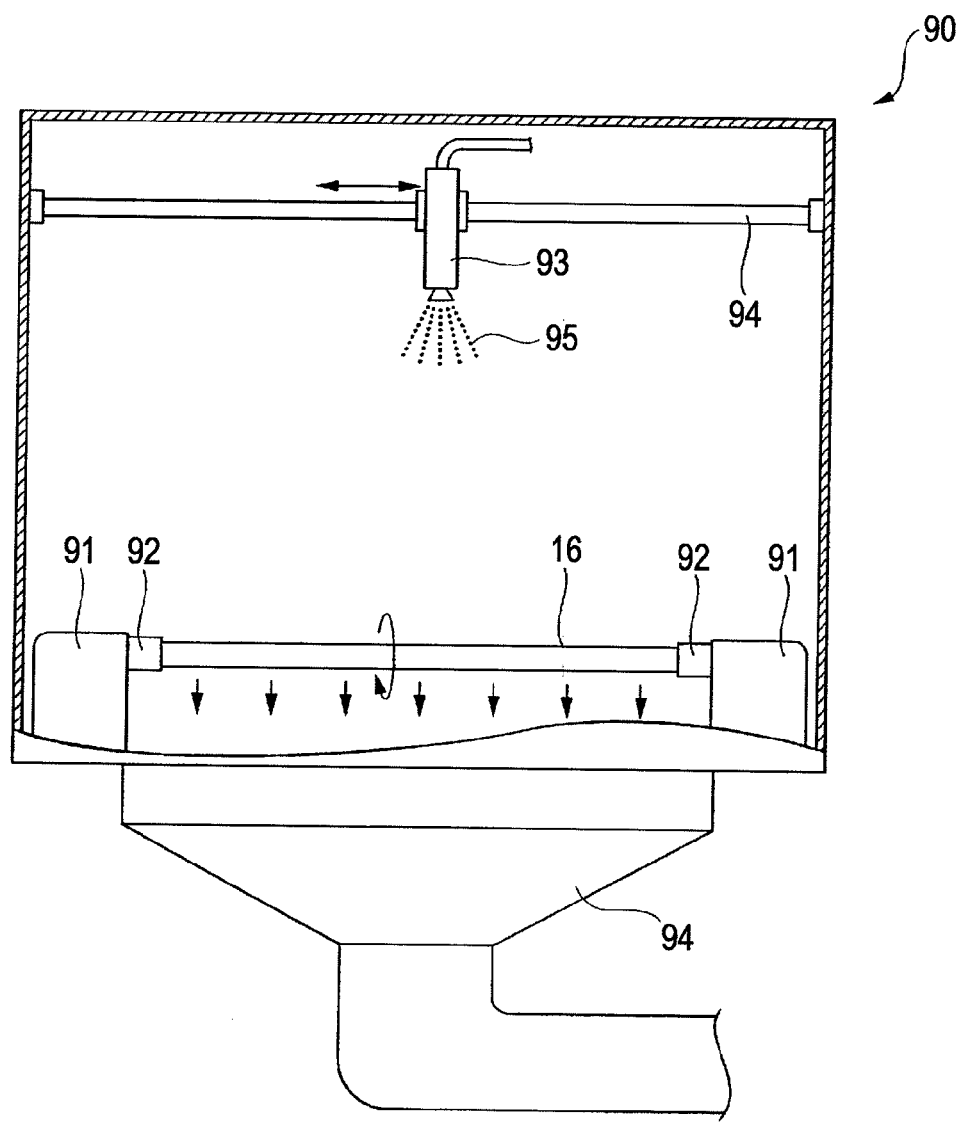
FIG. 10 is a diagram schematically illustrating a configuration of a paint booth for forming a high friction layer.

Next, the roller body 16 on which the resin film 51 is formed is picked out from the painting booth, and is transferred to another painting booth 90 shown in FIG. 10 by a handling robot (not shown). In the painting booth 90, rotation driving members 91 and 91 are provided on the lower portion thereof. In these rotation driving members 91 and 91, chucks 92 are provided to support the roller body 16 to be substantially horizontal. Then, both ends of the roller body 16 are held on and fixed to the chucks 92 and 92, and the chucks 92 and 92 are rotated by the rotation driving member 91. Therefore, the roller body 16 is rotationally driven around the shaft thereof at a slow speed of about, for example, 100 rmp to 500 rmp. Further, it is a matter of course that the roller body 16 may be somewhat obliquely supported.

In addition, in the painting booth 90, a corona gun 93 is disposed on the upper portion thereof. The corona gun 93 moves on the shaft 94 in a horizontal direction in FIG. 10. In addition, an evacuating mechanism 94 is provided on the bottom portion of the painting booth 90. With the evacuating mechanism 94, an air current slowly flows to the lower side in the painting booth 90. Further, the amount of suction air of the evacuating mechanism 94 is adequately set.

On the basis of such a configuration, while the roller body 16 is rotated around the shaft thereof and the alumina particles 95 are sprayed and blown out from the corona gun 93, the alumina particles 95 are selectively electrostatically-adsorbed on the resin film 51 formed on the roller body 16. In order to selectively electrostatically-adsorb the alumina particles on the resin film 51, both ends of the roller body 16 are masked by a tape or the like similar to the case of forming the resin film 51.

At the time of electrostatic coating, the surface potentials of the chuck 92 and the rotation driving member 91 are set to be substantially equal to the potential of the roller body 16, and moreover an inner surface potential of the painting booth 90 is set to be electrically neutralized so as to have a potential equivalent to substantial zero. This is because the alumina particles 95 from the corona gun 93 are not adsorbed to portions excepting the roller body 16. In order to keep the inner surface potential of the painting booth 90 electrically neutralized, it is preferable that the painting booth 90 is manufactured using a steel plate of which the electrical resistance of the inner surface is about, for example, $10^{11}$ Ω.

Then, the potential applied on the corona gun 93 is set to 0 V, and an air pressure applied to the corona gun 93 is set to be low, about 0.2 Mpa. While the corona gun 93 moves in the horizontal direction in FIG. 10, the alumina particles 95 with about a zero potential are blown out from the upper side and thus the alumina particles 95 fall freely under their own weight in a vertical direction. Then, as described above, weak static electricity (about +0.5 KV) remains on the resin film 51 of the roller body 16 because of the resin film 51 is formed by the electrostatic coating, so that alumina particles 95 are uniformly dispersed over the entire peripheral surface of the resin film 51 by the static electricity. The electrostatically adsorbed alumina particles 95 come into contact with the surface of the resin film 51 and a part thereof are in a state of being injected into the resin film 51, so that the outer peripheral surface of the roller body 16 is attached with the resin film 51 as a binder.

Here, in this embodiment, the inner surface potential of the painting booth 90 is electrically neutralized so as to have a potential equivalent to substantial zero. Furthermore, since an air current in the paint booth 90 is formed to flow slowly to the lower side, the alumina particles 95 fall freely under their own weight in a vertical direction. On the lower side in the falling direction, the roller body 16 is horizontally supported and slowly rotates around the shaft, so that alumina particles 95 are uniformly dispersed on the outer peripheral surface of the roller body 16.

Figure 9B:
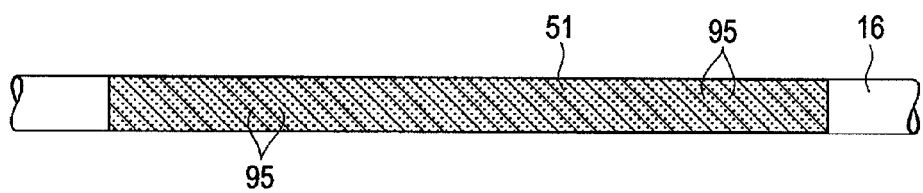
FIG. 9B is a diagram illustrating a formation process of a high friction layer on a roller body.

Therefore, in particular, the alumina particles 95 are uniformly attached on the surface of the resin film 51 which is not masked. Therefore, in the roller body 16, the alumina particles (inorganic particles) 95 are dispersed in and exposed from the resin film 51 on the center portion as shown in FIG. 9B. That is, when the alumina particles 95 come into contact with the resin film 51 by an electrostatic adsorption force, a part of the particles are injected into the resin film 51 so as to be in a state where the rest protrudes from the surface of the resin film 51. At this time, since the alumina particles 95 are easily vertically erected with respect to the surface of the roller body 16, the alumina particles 95 are uniformly distributed, and the most particles are attached such that the sharply-pointed ends (top portions) thereof face the outside.

Therefore, the alumina particles 95 exhibit a high frictional force due to the ends protruding from the surface of the resin film 51. Here, in order for the alumina particles 95 to exhibit a necessary and sufficient frictional force with respect to the paper P, it is preferable that an area occupied by the alumina particles 95 to an area of the resin film 51 is 20% to 80%.

Further, the coating (dispersion) of the alumina particles 95 is not limited to the coating by the electrostatic coating scheme as long as the alumina particles 95 are slowly dispersed to the lower side in the vertical direction. For example, a coating (dispersion) scheme using a spray gun may be employed.

Figure 9C:
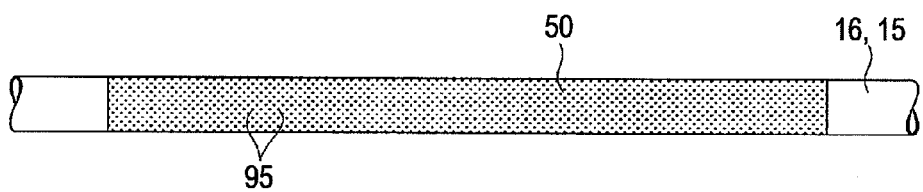
FIG. 9C is a diagram illustrating a formation process of a high friction layer on a roller body.

After the alumina particles 95 are dispersed on and attached to the resin film 51 as described above, the roller body 16 is heated at about 180° C. to 300° C. for 20 to 30 minutes and the resin film 51 is burned so as to be cured, so that the alumina particles 95 are fixed on the roller body 16. As a result, as shown in FIG. 9C, the alumina particles (inorganic particles) 95 are dispersed in and exposed from the resin film 51 so as to form the high friction layer 50, and the transport roller 15 according to the invention is obtained.

Further, in the above-mentioned embodiment, the coating (spraying) of the resin particles and the coating (spraying) of the alumina particles (inorganic particles) are carried out in the separate painting booths, but it is a matter of course that both coatings may be carried out in the same painting booth.

When the high friction layer 50 is formed as described above, in particular the joining portion 80 shown in FIGS. 7A and 7B, there is no groove caused by the gap between the ends (end surfaces) 61a and 61b of the metal plate 60, and the gap between the ends 61a and 61b is buried mainly by the alumina particles 95.

Figure 11:
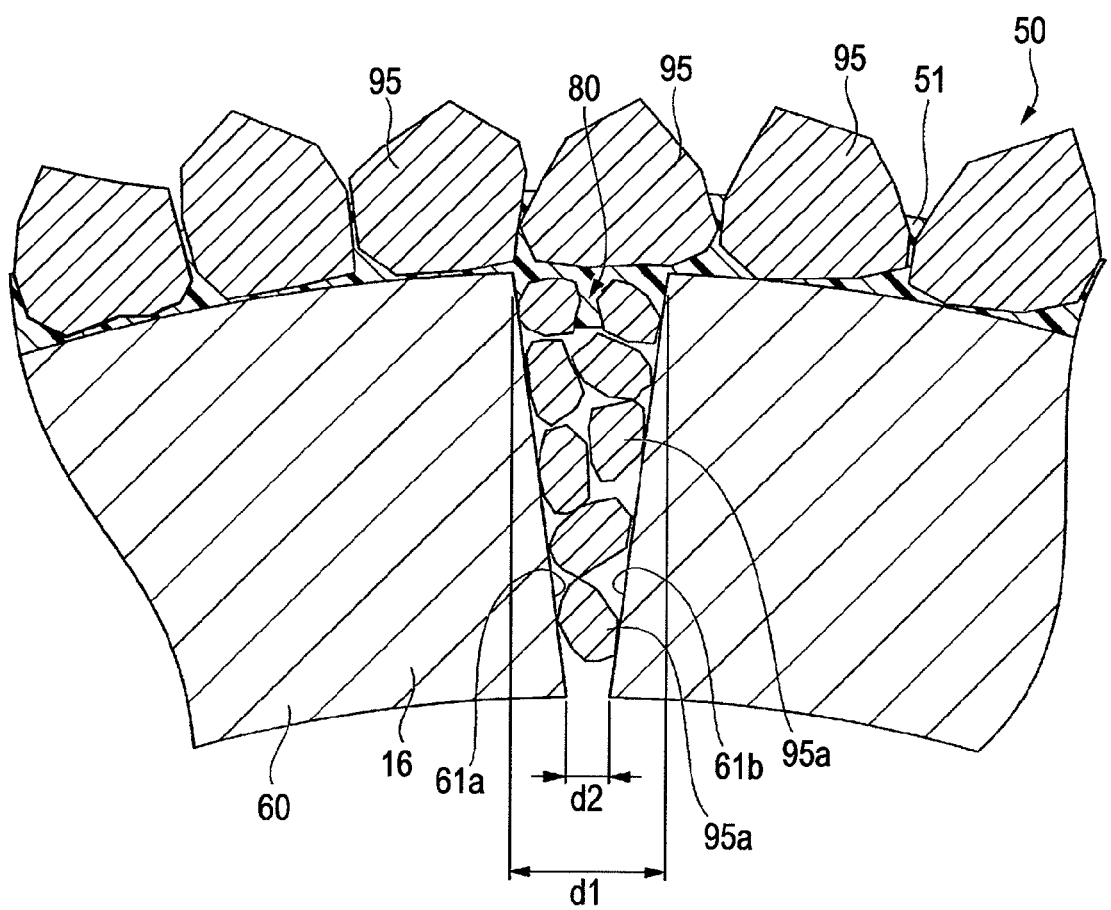
FIG. 11 is an enlarged view illustrating a main part of a joining portion of a roller body and the vicinity thereof.

That is, the alumina particles 95 are used of which the average particle diameter is larger than the distance d1 on the outer peripheral surface side of the joining portion 80, so that the most of the alumina particles 95 do not enter the joining portion 80, but as shown in FIG. 11, attached to the outer peripheral surface of the roller body 16 via the resin film 51 as shown in FIG. 11. Therefore, regardless of whether or not the gap is formed between the ends 61a and 61b of the metal plate 60, the alumina particles 95 cover the gap of the joining portion 80, so that the groove caused by the gap is substantially not formed.

In addition, the alumina particles 95 are used of which the particle diameter distribution (particle size range) includes the particles 95a, smaller than the distance d1 on the outer peripheral surface side and larger than the distance d2 (10 μm) on the inner peripheral surface side of the joining portion 80. Therefore, the particles 95a enter the gap which is formed in the joining portion 80 so as to remain therein, so that the groove caused by the joining portion 80 is reliably not formed. In addition, even though a force is applied to the roller body 16 (transport roller 15) in a direction to narrow the gap when it is operating, the alumina particles 95a, which enter the gap, stand against the force, so that deformation of the roller body 16 (transport roller 15) is prevented. Therefore, the transport roller mechanism 19 provided with the transport roller 15 is prevented from undergoing uneven transportation which is caused by the deformation of the transport roller 15.

In the roller body (cylindrical shaft) 16 constituted by the transport roller 15 as described above, the joining portion 80 formed between the pair of the ends 61a and 61b is formed of the central linear section 86 which is formed in the linear shape as shown in FIG. 7A, and the folded section 85 which is formed on both sides of the central linear section 86. Therefore, there is no concave-convex portion to be fitted in the central linear section 86. For this reason, deformation or distortion hardly occurs in the roller body 16 compared with the case where the fitting sections are formed by the concave-convex portions over the entire length of the joining portion 80. In addition, the accuracy of the shaft or the dimension such as the roundness or the deflection is easily obtained.

In addition, as shown in FIG. 8, the distance d5 between the pair of the ends facing each other in the intersection 87a of the folded section 85 is formed shorter than the distance d6 between the pair of the ends facing each other in the central linear section 86. Therefore, the distance d5 in the intersection 87a is relatively shortened, so that the gap formed between the ends is significantly narrowed, or the gap is removed. Accordingly, when the metal plate as the base material is subjected to the press work, in particular, the deviation between one end 61a and the other end 61b in the longitudinal direction (axial direction) can be regulated by a pair of the ends of the intersection 87a. Therefore, deformation or distortion can be suppressed on the roller body 16 to be obtained. In particular, if the pair of the ends facing each other are formed such that the end surfaces thereof come into contact with each other in the intersection 87a and the gap between the ends is removed, the effect that deformation or distortion is suppressed on the roller body 16 can be remarkably exhibited.

In addition, since the first linear section 87*b* and the second linear section 87*c* which constitutes the connection linear section 85*a* of the folded section 85 are formed to be substantially parallel to the center axis 16*a* of the roller body 16, the connection linear sections 85*a* are formed to be parallel to the central linear section 86. Therefore, when the metal plate 60 as a base material is subjected to the press work, the pair of the ends 61*a* and 61*b* facing to each other over the entire length of the joining portion can be formed close to each other with relatively high accuracy or come into contact with each other.

In addition, the first linear section 87*b* of the connection linear section 85 and the central linear section 86 are formed on the same straight line, so that when the metal plate 60 is subjected to the press work, the pair of the ends facing each other over the entire length of the joining portion can be also formed close to each other with relatively high accuracy or come into contact with each other.

In addition, The first linear section 87*b* of the connection linear section 85 is formed longer than the second linear section 87*c*, so that when the metal plate is subjected to the press work, the pair of the ends facing each other over the entire length of the joining portion can be also formed close to each other with relatively high accuracy or come into contact with each other.

In addition, the intersection 87*a* of the folded section 85 is formed to be extended in a direction substantially perpendicular to the center axis 16*a* of the roller body 16, so that when the metal plate 60 is subjected to the press work, the ends facing each other in the intersection 87*a* can be formed close to each other with relatively high accuracy or come into contact with each other.

Then, the transport roller 15 which includes the high friction layer 50 formed on the roller body 16 as described above uses the roller body (cylindrical shaft) 16 which is obtained such that the metal plate 60 is subjected to the press work to be formed in a cylindrical shape. Therefore, the cost reduction and the weight reduction can be achieved compared with the case where a round bar made of a solid material is used. In addition, since the high friction layer 50 containing the alumina particles 95 (inorganic particles) is provided, a good transportation force is exhibited.

Furthermore, since the roller body 16 is easily formed to obtain a good accuracy of the shape or the dimension as described above, uneven transportation caused by the insufficient accuracy is suppressed.

In addition, both ends of the roller body 16 (transport roller 15) are generally a part for attaching the connection element of the driving system such as a toothed wheel. The center portion of the roller body 16 comes into direct contact with the paper P (recording medium). Therefore, in this embodiment, since the high friction layer 50 is provided on the center portion excepting both ends of the roller body 16, the transportation performance of the paper P is not degraded, and the cost of the material for the high friction layer 50 can be reduced to a minimum.

Figure 12A:
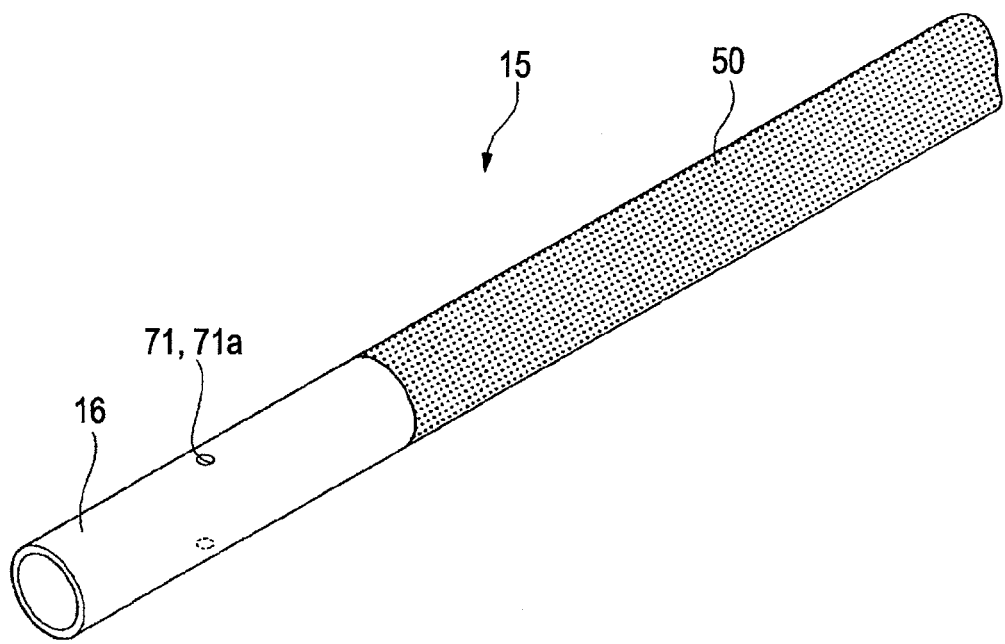
FIG. 12A is a perspective view illustrating a main part of a roller body.
Figure 12B:
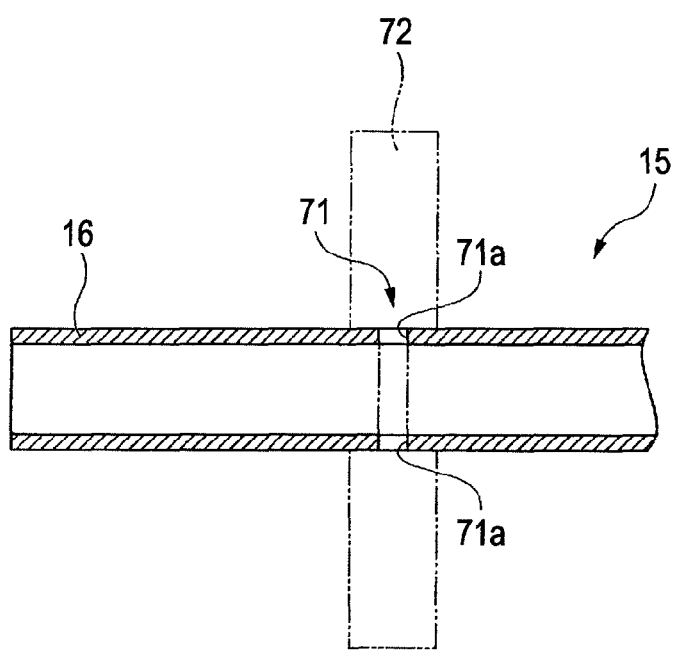
FIG. 12B is a sectional side view illustrating a main part of a roller body.

Here, on one end or both ends of the roller body 16 (transport roller 15), an engaging section can be formed for connecting various connection elements such as the transport driving gear 35 or the inner gear 39 shown in FIG. 2. For example, as shown in FIGS. 12A and 12B, the respective through holes 71*a* and 71*a* are formed on positions facing the roller body 16 which is constituted by the cylindrical pipe (hollow pipe), that is, on two forming surfaces which define a diameter of the roller body 16. Then, an engaging hole (engaging section) 71 including the pair of the through holes 71*a* and 71*a* can be formed. According to the engaging hole 71, the connection element 72 such as a toothed wheel can be fixed by a shaft or a pin (not shown).

Figure 13A:
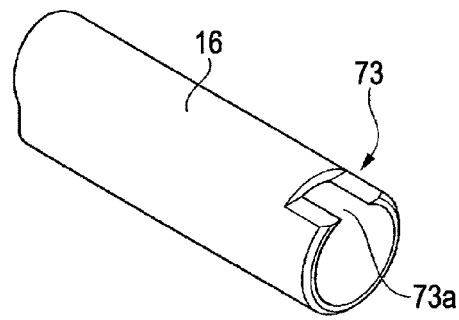
FIG. 13A is a perspective view illustrating a main part of a roller body.
Figure 13B:
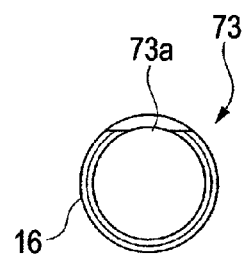
FIG. 13B is a side view illustrating a roller body.

In addition, as shown in FIGS. 13A and 13B, a D-cut engaging section 73 may be formed on an end of the roller body 16. The engaging section 73 is formed on an end of the cylindrical hollow pipe (roller body 16). In addition, as shown in FIG. 13A, a part of the engaging section 73 is notched in a rectangular shape in plane view, so that an opening 73*a* is formed. Therefore, as shown in FIG. 13B, the appearance of the side surface of the end is formed to be an apparent D.

Therefore, the connection element (not shown) such as a toothed wheel is engaged with the engaging section 73 which is formed in an apparent D, so that the connection element can be attached to the roller body 16 (transport roller 15) without rotating with respect to the roller body 16. In addition, in the engaging section 73, an opening 73*a* in a groove shape is formed to be linked with an inner hole of the hollow pipe (roller body 16). Therefore, even using the opening 73*a*, the connection element can be attached to the roller body 16 without slippage. Specifically, a convex portion is formed on the connection element in advance, and the convex portion is fitted with the opening 73*a*, so that free running can be prevented.

Figure 14A:
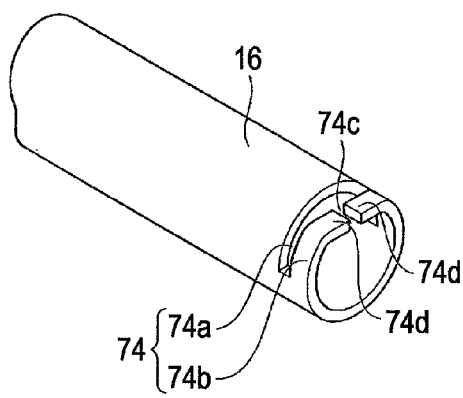
FIG. 14A is a perspective view illustrating a main part of a roller body.
Figure 14B:
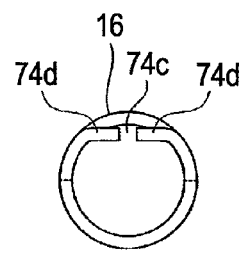
FIG. 14B is a side view illustrating a roller body.

In addition, as shown in FIGS. 14A and 14B, an engaging section 74 which includes a groove 74*a* and a D-cut portion 74*b* may be formed on the end of the roller body 16. In the engaging section 74, the D-cut portion 74*b* is formed on the outer end of the roller body 16, and the groove 74*a* is formed on the inside from the D-cut portion 74*b*. As shown in FIG. 14A, the groove 74*a* is formed by notching half of the roller body 16 in the circumference direction thereof. The D-cut portion 74*b* includes an opening 74*c* which is extended in a direction perpendicular to the groove 74*a* in the outside of the groove 74*a*, and a pair of folded pieces 74*d* and 74*d* on both sides of the opening 74*c*. That is, as shown in FIG. 14B, the pair of the folded pieces 74*d* and 74*d* is folded toward the center axis of the roller body 16. Portions corresponding to these folded pieces 74*d* and 74*d* are dented from the circular outer peripheral surface of the roller body 16.

Therefore, the connection element (not shown) such as a toothed wheel is engaged with the groove 74*a* or the D-cut portion 74*b*, so that the connection element can be attached to the roller body 16 (transport roller 15) without slippage. In addition, in the engaging section 74, even using the opening 74*c* formed between the folded pieces 74*d*, the connection element can be attached to the roller body 16 without slippage. Specifically, a convex portion is formed on the connection element in advance, and the convex portion is fitted with the opening 74*c*, so that free running can be prevented.

Figure 15A:
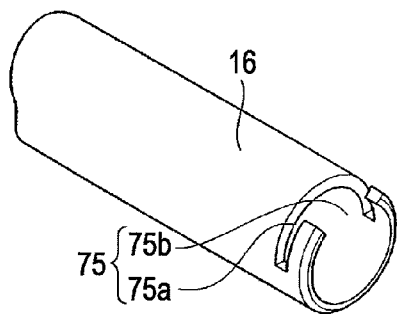
FIG. 15A is a perspective view illustrating a main part of a roller body.
Figure 15B:
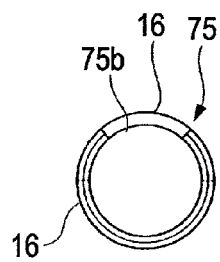
FIG. 15B is a side view illustrating a roller body.

In addition, as shown in FIGS. 15A and 15B, an engaging section 75 which includes a groove 75*a* and an opening 75*b* may be formed on the end of the roller body 16. In the engaging section 75, the opening 75*b* is formed on the outer end of the roller body 16, and the groove 75*a* is formed on the inside from the opening 75*b*. As shown in FIG. 15A, the groove 75*a* is formed by notching half of the roller body 16 in the circumference direction thereof. The opening 75*b* is formed by notching a part of the roller body 16 in a rectangular shape in plane view on the outside of the groove 75*a*, so that as shown in FIG. 15B, the appearance of the side surface of the end is formed to be an apparent D.

Therefore, the connection element (not shown) such as a toothed wheel is engaged with the groove 75*a* or the portion which is formed in the apparent D by the opening 75*b*, so that the connection element can be attached to the roller body 16

(transport roller 15) without slippage. In addition, in also the engaging section 75, even using the opening 75*b* similarly to the engaging section 73 shown in FIGS. 13A and 13B, the connection element can be attached to the roller body 16 without slippage.

The roller body 16 obtained by the pressing work on the metal plate 60 is subjected to a cutting work or the like, so that the engaging hole 71 and the engaging sections 73, 74, and 75 can be formed. For example, in the engaging section 73 shown in FIGS. 13A and 13B, the end thereof is subjected to the cutting work so as to form the opening 73*a*, and thus the engaging section 73 in the apparent D can be formed. In addition, also in the engaging hole 71 shown in FIGS. 12A and 12B, the roller body 16 is subjected to a punching work, so that the pair of the through holes 71*a* and 71*a* can more suitably face.

However, implementing another work on the roller body 16 as described above degrades the efficiency in cost and time because separate work processes are added only to form the engaging sections. Therefore, before the roller body 16 is subjected to the press work, a developed engaging section which becomes the engaging section is formed with a metal plate by another press work in advance. Then, when the metal plate is subjected to the press work so as to form the roller body 16, it is preferable that the engaging section is also formed at the same time.

Figure 16A:
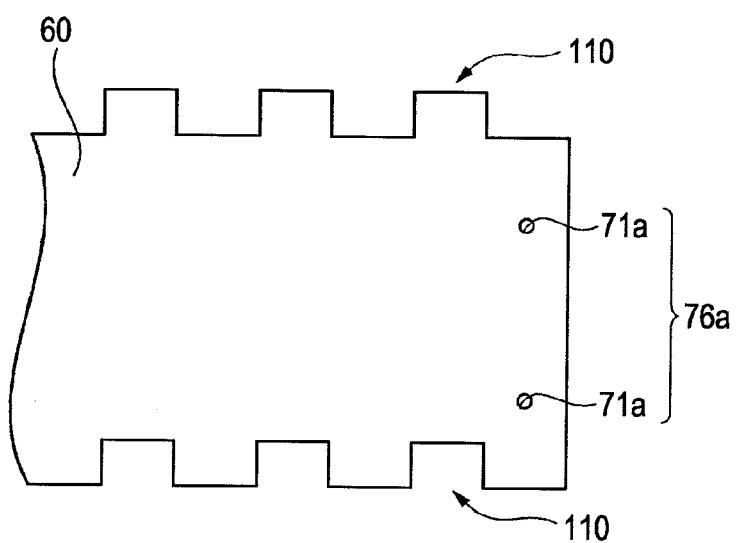
FIG. 16A is a plan view illustrating a main part of a metal plate showing a developed engaging section.

Specifically, a large-scale metal plate (first metal plate) 65 shown in FIG. 4A is subjected to the press work so as to form a thin and long substantially-rectangular plate-shaped metal (second metal plate) 60 having the concave-convex portion 110 as shown in FIG. 4B. In the press work, the large-scale metal plate 65 is machined in the small-scale metal plate 60. While at the same time, the developed engaging section in a shape, such as a notch shape, a protruding piece shape, a hole shape, or a groove shape, is formed on the end of the obtained metal plate 60 in the longitudinal direction of the long side, that is, on the outer end of the folded section 85. For example, as shown in FIG. 16A, the pair of the through holes 71*a* and 71*a* is machined on a predetermined position of the outer end of the concave-convex portion 110 of the metal plate 60 so as to prepare these as a developed engaging section 76*a*. Then, the metal plate 60 is subjected to the press work, so that the pair of the through holes 71*a* and 71*a* face each other, and thus the engaging hole 71 shown in FIGS. 12A and 12B can be formed.

Figure 16B:
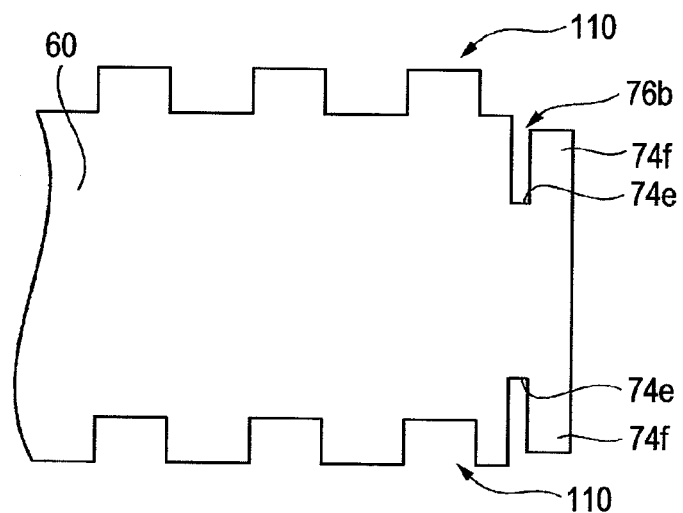
FIG. 16B is a plan view illustrating a main part of a metal plate showing a developed engaging section.

In addition, as shown in FIG. 16B, the outer end of the concave-convex portion 110 of the metal plate 60 is notched in a predetermined shape so as to be prepared as a developed engaging section 76*b*. Then, the metal plate 60 is subjected to the press work, so that the engaging section 74 shown in FIGS. 14A and 14B can be formed. That is, a pair of notched portions (concave portions) 74*e* and 74*e* and a pair of protruding pieces 74*f* and 74*f* are formed as a developed engaging section 76*b*, so that the engaging section 74 can be formed. In this example, after the metal plate 60 is subjected to the press work, it is necessary that the pair of the protruding pieces 74*f* and 74*f* is subjected a folding work to be folded to the inside, so that the folded piece 74*d* is formed. Therefore, it can be regarded as that the work process is slightly insufficient for increasing the efficiency in cost and time.

Figure 16C:
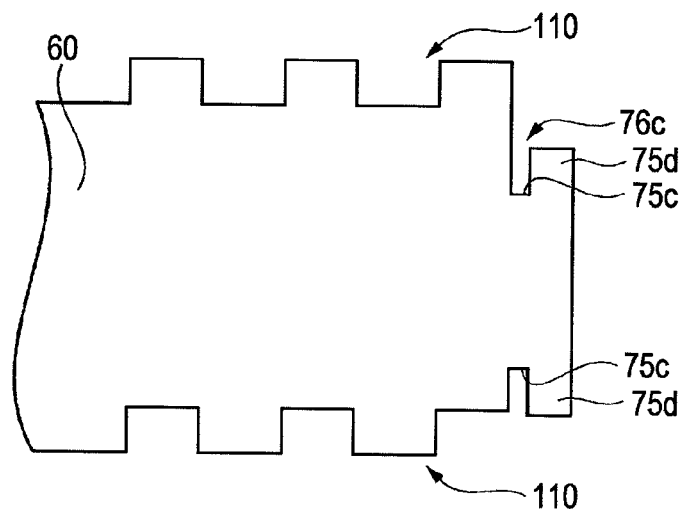
FIG. 16C is a plan view illustrating a main part of a metal plate showing a developed engaging section.

As shown in FIG. 16C, the outer end of the concave-convex portion 110 of the metal plate 60 is notched in a predetermined shape so as to be prepared as a developed engaging section 76*c*. Then, the metal plate 60 is subjected to the press work, so that the engaging section 75 shown in FIGS. 15A and 15B can be formed. That is, a pair of notched portions (concave portions) 75*c* and 75*c* and a pair of protruding pieces 75*d* and 75*d* are formed as a developed engaging section 76*c*, so that the engaging section 75 can be formed. In this example, when the metal plate 60 is subjected to the press work, the pair of the protruding pieces 75*d* and 75*d* is also bent in an arcuate shape, so that the opening 75*b* shown in FIG. 15B can be formed between these protruding pieces 75*d* and 75*d*. Therefore, the roller body 16 formed by the press work is unnecessary to be subjected to additional work. In addition, the work process can be sufficient for increasing the efficiency in cost and time.

Next, operations of an ink jet printer (printing apparatus) 1, which is provided with the transport roller mechanism 19, will be described with reference to FIGS. 1 and 2.

When the paper P fed by the paper feeding roller 13 reaches the vicinity of the transport roller mechanism 19 in an upstream side, the paper P enters between the transport roller 15 and the driven roller 17. Then, as both rollers are driven, the paper P is transported to the lower side of the print head 21 which is positioned on a downstream side.

At this time, since the high friction layer 50 is formed on the transport roller 15 and the driven roller 17 is disposed in a position coming into contact with the high friction layer 50, the force for interposing the paper P between the transport roller 15 and the driven roller 17 becomes large, so that the transportability of the paper P is more favorable. In particular, since the alumina particles with a predetermined particle diameter are used when the high friction layer 50 is formed, the transport roller 15 has no groove caused by the joining portion 80. Therefore, uneven transportation caused by the groove is also prevented. Furthermore, since the roller body 16 is formed with good accuracy of the shape or the dimension, so that uneven transportation is also prevented. Accordingly, the transport roller mechanism 19 feeds (transport) paper with great accuracy and stability.

When the starting end of the paper P reaches a predetermined printing position under the print head (print unit) 21, the printing starts.

Thereafter, when the leading end of the paper P reaches the discharge roller mechanism 27, a paper discharge operation starts. Further, since the transport speed of the discharge roller mechanism 27 is set to be higher than the transport speed of the transport roller mechanism 19, the paper P is transported under back tension. In this case, when the transport roller mechanism 19 and the discharge roller mechanism 27 interpose the paper P at the same time, the transport speed of the paper is defined by the transport speed of the transport roller mechanism 19 as described above. Therefore, even when discharging and transporting are carried out by the discharge roller mechanism 27 and the transport roller mechanism 19 at the same time, the transport speed of the paper is defined by the transport speed of the transport roller mechanism 19. Therefore, the paper is accurately and stably fed (transported) without uneven transportation.

As described above, in the transport roller 15 according to the embodiment, the roller body (cylindrical shaft) 16 is used which is obtained such that the metal plate 60 is subjected to the press work to be formed in a cylindrical shape. Therefore, the cost reduction and the weight reduction can be achieved compared with the case where a round bar made of a solid material is used. In addition, since the high friction layer 50 containing the alumina particles 95 (inorganic particles) is provided, a good transportation force can be exhibited. Furthermore, since the roller body 16 is easily formed with good accuracy of the shape or the dimension as described above, uneven transportation caused by the insufficient accuracy is also suppressed.

In addition, the high friction layer 50 is selectively provided on the center portion excepting the ends of the roller body 16, that is, the center portion with which the paper P (recording medium) comes into contact. Therefore, the transportation performance of the paper P is not degraded, and the cost of the material for the high friction layer 50 can be reduced to a minimum. Furthermore, since the high friction layer 50 is provided at least on the region corresponding to the central linear section 86, the cost of the material for the high friction layer 50 can be also reduced to a minimum. In this case, the invention is not limited to the transport roller, but the high friction layer 50 may be formed over the entire length of the roller body 16, for example.

In addition, the transport unit according to the embodiment is provided with the transport roller 15 which can be reduced in cost and weight, and in which uneven transportation is prevented. Therefore, the transport unit itself can be reduced in cost and weight, and furthermore the transportability of the recording medium by the transport roller 15 is also excellent.

In addition, since the ink jet printer (printing apparatus) 1 according to the embodiment is provided with the transport unit, the cost and the weight can be reduced, and furthermore the ink jet printer is excellent in transporting the recording medium.

Further, the invention is not limited to the above-mentioned embodiments, but various changes can be made without departing the scope of the invention.

For example, in this embodiment, regarding the joining portion of the cylindrical shaft (roller body) according to the invention, as shown in FIG. 8, the intersection 87a of the folded section 85 is formed to be perpendicular to the center axis of the roller body 16, but the intersection 87a may not perpendicular to the center axis. In the folded section 85, the angle on the tip end side of a convex piece 87d, which is formed by the pair of the intersections 87a and 87a and the second linear section 87c, may be formed to be an obtuse angle (180° or less). With such a configuration, when the pair of the ends 61a and 61b are formed close to each other in the press work of the metal plate, the tip end of the convex piece 87d is easily fitted to the corresponding concave portion. Therefore, deformation or distortion can be suppressed on the roller body 16.

In addition, in the above-mentioned embodiments, the transport roller according to the invention is applied to the transport roller 15 of the transport roller mechanism 19. However, the transport roller can be applied to the paper discharge roller 29 or to the paper discharge GIZA roller 31 of the paper discharge roller mechanism 27, and furthermore also can be applied to the driven roller 17 (roller 17a) of the transport roller mechanism 19.

What is claimed is:

1. A transport roller comprising:
a cylindrical shaft of which a pair of ends are formed in a cylindrical shape by a press work so as to form a joining portion therebetween,
wherein the joining portion includes:
a central linear section which is provided on a center portion in an axis direction of the cylindrical shaft and is formed in a linear shape to be parallel to the axis direction of the cylindrical shaft, wherein the central linear section is provided on a region of the center portion with which a medium transported by the transport roller comes into contact; and
a folded section that includes at least one intersection provided outside of the region of the center portion with which the medium transported by the transport roller comes into contact and disposed so as to extend in a direction transverse to the axis direction of the cylindrical shaft.

2. The transport roller according to claim 1, wherein a distance between the pair of the ends of the central linear section is greater than a distance along which the folded portion having the at least one intersection extends.

3. The transport roller according to claim 1, wherein the pair of the ends facing each other in the intersection is formed such that end surfaces thereof come into contact with each other.

4. The transport roller according to claim 1, wherein the connection linear section is formed to be parallel to a center axis of the cylindrical shaft.

5. The transport roller according to claim 1, wherein the intersection is formed so as to be extended in a direction substantially perpendicular to a center axis of the cylindrical shaft.

6. The transport roller according to claim 1, wherein the connection linear section is constituted by a first linear section which connects ends on one side of a pair of intersections and a second linear section which connects ends on the other side of the pair of intersections, and
wherein the first linear section and the central linear section are formed on the same straight line.

7. The transport roller according to claim 6, wherein the first linear section is formed longer than the second linear section.

8. The transport roller according to claim 1 further comprising:
a high friction layer which is provided on a surface of the cylindrical shaft and contains inorganic particles.

9. The transport roller according to claim 8, wherein the high friction layer is provided on at least a region with which a medium transported by the transport roller comes into contact.

10. The transport roller according to claim 8, wherein the high friction layer is provided on at least a region corresponding to the central linear section.

11. A transport unit comprising:
the transport roller according to claim 8,
a driven roller which is driven as the transport roller is rotated, and
a driving device which rotatably drives the transport roller.

12. The transport unit according to claim 11, wherein a surface of the driven roller is subjected to a low-abrasion treatment.

13. The transport unit according to claim 11, wherein the driven roller is disposed at a position coming into contact with the high friction layer of the transport roller.

14. A printing apparatus comprising:
the transport unit according to claim 11,
a print unit which carries out a printing process on a transported recording medium, and
a control unit which controls the printing process of the print unit.

15. The transport roller according to claim 1, wherein the folded section is disposed near an end of the center portion.

16. The transport roller according to claim 1, wherein the folded section is disposed on both ends of the center portion.

17. A transport roller comprising:
a cylindrical shaft of which a pair of ends are formed in a cylindrical shape by a press work so as to form a joining portion therebetween, wherein the joining portion includes:
- a central linear section which is provided on a center portion in an axis direction of the cylindrical shaft and is formed in a linear shape to be parallel to the axis direction of the cylindrical shaft, wherein the central linear section is provided on a region of the center portion with which a medium transported by the transport roller comes into contact; and
- a section having a convex portion corresponding with a concave portion, wherein a corresponding part of the convex and concave portions includes at least one intersection provided outside of the region of the center portion with which the medium transported by the transport roller comes into contact and disposed so as to extend in a direction transverse to the axis direction of the cylindrical shaft.

18. A printing apparatus comprising: the transport roller according to claim 17, wherein the transport roller contacts the recording medium.

19. A transport roller comprising:
a cylindrical shaft of which a pair of ends are formed in a cylindrical shape by a press work so as to form a joining portion therebetween, wherein the joining portion includes:
- a central linear section which is provided on a center portion in an axis direction of the cylindrical shaft and is formed in a linear shape to be parallel to the axis direction of the cylindrical shaft, wherein the central linear section is provided on a region of the center portion with which a medium transported by the transport roller comes into contact; and
- a section having a convex portion corresponding with a concave portion, wherein a corresponding part of the convex and concave portions includes at least one intersection, wherein each and every intersection of the at least one intersection is provided outside of the region of the center portion with which the medium transported by the transport roller comes into contact and disposed so as to extend in a direction transverse to the axis direction of the cylindrical shaft.

20. A printing apparatus comprising:
the transport roller according to claim 19, wherein the transport roller contacts the recording medium.

* * * * *